United States Patent
Osugi et al.

(10) Patent No.: US 9,524,010 B2
(45) Date of Patent: Dec. 20, 2016

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Akiyoshi Osugi, Kanagawa (JP); Yasuhiro Nakatani, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 22 days.

(21) Appl. No.: 14/721,725

(22) Filed: May 26, 2015

(65) Prior Publication Data

US 2016/0162003 A1 Jun. 9, 2016

(30) Foreign Application Priority Data

Dec. 3, 2014 (JP) .................................. 2014-244924

(51) Int. Cl.
G06F 1/32 (2006.01)
G06F 1/00 (2006.01)
G06F 1/26 (2006.01)

(52) U.S. Cl.
CPC ............... *G06F 1/3206* (2013.01); *G06F 1/26* (2013.01)

(58) Field of Classification Search
CPC ..................................... G06F 1/32; G06F 1/26
See application file for complete search history.

(56) References Cited

U.S. PATENT DOCUMENTS

| | | | |
|---|---|---|---|
| 2003/0126486 A1* | 7/2003 | Bui ........................ | H04L 12/12 713/320 |
| 2003/0206564 A1* | 11/2003 | Mills ....................... | H04L 12/12 370/528 |
| 2005/0123109 A1* | 6/2005 | Yamagishi .............. | H04L 12/12 379/102.01 |
| 2008/0008141 A1* | 1/2008 | Tchigevsky ............. | H04W 8/18 370/338 |
| 2009/0114722 A1* | 5/2009 | Chen ..................... | G06F 3/0605 235/441 |

(Continued)

FOREIGN PATENT DOCUMENTS

JP 2009-111688 A 5/2009
WO 2009/057477 A1 5/2009

*Primary Examiner* — Phil Nguyen
(74) *Attorney, Agent, or Firm* — Sughrue Mion, PLLC

(57) ABSTRACT

An information processing apparatus includes transmitting/receiving sections, response processing sections, a determining section, and a controller. The transmitting/receiving sections transmit and receive data. The response processing sections correspond to the transmitting/receiving sections in a one-to-one relationship. A state of each response processing section is switchable between a first state and second state. The determining section determines priorities of state transition processes for the response processing sections. In a case where a second response processing section starts a state transition process while a first response processing section is performing a state transition process and in a case where the second response processing section is given a higher priority than the first response processing section, the controller controls the response processing sections to suspend the state transition process for the first response processing section and to start the state transition process for the second response processing section.

18 Claims, 5 Drawing Sheets

(56) References Cited

U.S. PATENT DOCUMENTS

2013/0091311 A1* 4/2013 Caballero ............. G06F 13/102
 710/63
2014/0129856 A1* 5/2014 Bertin .................... G06F 1/325
 713/320

* cited by examiner

FIG. 6

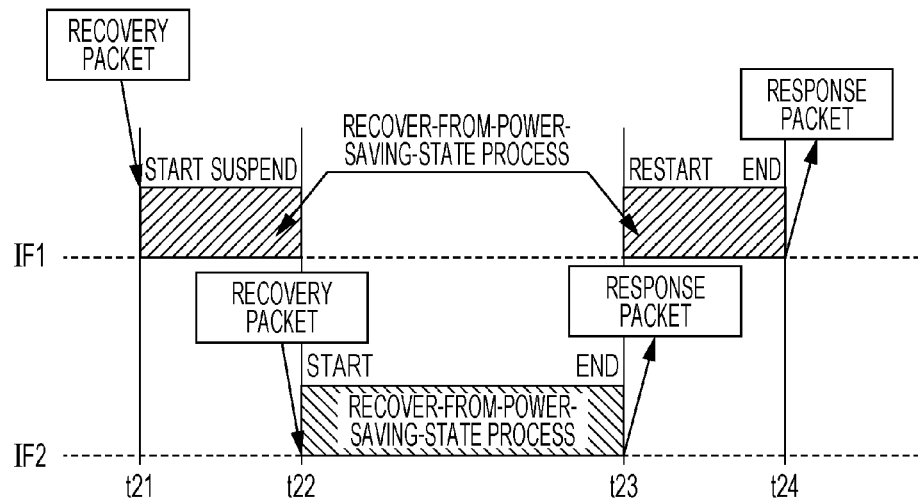

FIG. 7

| PARAMETER | DETAILS |
|---|---|
| x1 | THE NUMBER OF TIMES SYN PACKET HAS BEEN RECEIVED AND THE NUMBER OF TIMES SYN/ACK PACKET HAS BEEN TRANSMITTED |
| x2 | THE NUMBER OF IP ADDRESSES OR MAC ADDRESSES REGISTERED IN ARP TABLE |
| x3 | THE NUMBER OF PORTS WHOSE STATE IN TCP/IP COMMUNICATION IS LISTEN |
| x4 | THE NUMBER OF PORTS AVAILABLE IN UDP COMMUNICATION |
| x5 | LARGER/SMALLER OF THE NUMBER OF TRANSMITTED/ RECEIVED PACKETS (0 OR 1) |
| x6 | LARGER/SMALLER OF THE NUMBER OF TRANSMITTED/ RECEIVED PACKETS IN SIZE OF MTU (0 OR 1) |
| x7 | LARGER/SMALLER OF THE NUMBER OF PACKETS RECEIVED FROM TERMINAL APPARATUS IN SUB-NETWORK (0 OR 1) |
| x8 | LARGER/SMALLER OF THE NUMBER OF PACKETS RECEIVED VIA GATEWAY (0 OR 1) |
| x9 | HIGHER/LOWER OF COMMUNICATION SPEED (0 OR 1) |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-244924 filed Dec. 3, 2014.

BACKGROUND (i) Technical Field

The present invention relates to an information processing apparatus, an information processing method, and a non-transitory computer readable medium.

(ii) Related Art

There is suggested a technique of connecting an information processing apparatus, such as a communication apparatus, to plural networks by providing plural communication interfaces to the information processing apparatus.

SUMMARY

According to an aspect of the invention, there is provided an information processing apparatus including plural transmitting/receiving sections, plural response processing sections, a determining section, and a controller. The plural transmitting/receiving sections transmit data to and receive data from plural networks. The plural response processing sections correspond to the plural transmitting/receiving sections in a one-to-one relationship. A state of each of the plural response processing sections is switchable between a first state and a second state. The first state is a state in which the response processing section does not perform a response process on data received from a corresponding one of the plural transmitting/receiving sections and leaves processing of the data to a controller in a subsequent stage. The second state is a state in which the response processing section does not leave processing of data received from a network to the controller and performs a response process on at least part of the data. The determining section determines priorities of state transition processes for the plural response processing sections. The state transition processes are processes in which the plural response processing sections are switched from the second state to the first state. In a case where a second response processing section among the plural response processing sections starts a state transition process while a first response processing section among the plural response processing sections is performing a state transition process and in a case where the priorities determined by the determining section indicate that the second response processing section is given a higher priority than the first response processing section, the controller controls the plural response processing sections to suspend the state transition process for the first response processing section and to start the state transition process for the second response processing section.

BRIEF DESCRIPTION OF THE DRAWINGS

An exemplary embodiment of the present invention will be described in detail based on the following figures, wherein:

FIG. 6 is a timing chart illustrating a recover-from-power-saving-state process performed by the image forming apparatus according to the exemplary embodiment;

FIG. 7 is a diagram illustrating parameters that are used to determine priorities of recover-from-power-saving-state processes according to the exemplary embodiment;

DETAILED DESCRIPTION

Figure 1:
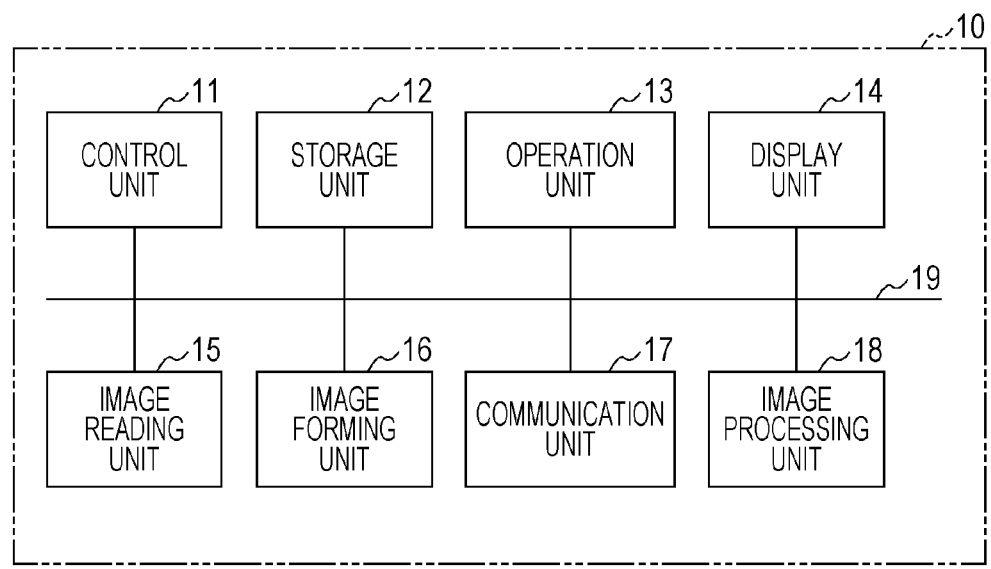
FIG. 1 is a block diagram illustrating the hardware configuration of an image forming apparatus according to the exemplary embodiment.

FIG. 1 is a block diagram illustrating the hardware configuration of an image forming apparatus 10 according an exemplary embodiment of the present invention. As illustrated in FIG. 1, the image forming apparatus 10 is an information processing apparatus that includes a control unit 11, a storage unit 12, an operation unit 13, a display unit 14, an image reading unit 15, an image forming unit 16, a communication unit 17, and an image processing unit 18. The individual units of the image forming apparatus 10 are connected to a bus 19, and transmit and receive various data via the bus 19.

The control unit 11 controls the operations of the individual units of the image forming apparatus 10. The control unit 11 includes an arithmetic processing device, such as a central processing unit (CPU), and storage media (main storage devices), such as a read only memory (ROM) and a random access memory (RAM). The CPU (a CPU 110 described below) reads programs stored in the ROM and the storage unit 12 and executes the programs by using the RAM as a working area. The control unit 11 executes the programs in this way and thereby forms an image on a sheet, generates image data by reading an image from a document, and communicates with another apparatus via a communication network.

The storage unit 12 stores data. The storage unit 12 includes a storage medium (auxiliary storage device), such as a hard disk or a flash memory, and stores data received by the communication unit 17, data generated by the image forming apparatus 10, and so forth. The storage unit 12 may include a removable storage medium (removable medium), such as a memory card or a universal serial bus (USB) memory, and a unit for reading data from and writing data on the storage medium. The storage unit 12 stores a control program, which will be described below.

The operation unit 13 accepts a user operation. The operation unit 13 includes an operator (a button, a key, or the like), and supplies a control signal corresponding to a pressed operator to the control unit 11. The operation unit 13 may be constituted by a touch panel that includes the display unit 14 and a sensor superposed on a display surface of the display unit 14 and that supplies a control signal corresponding to a pressed position to the control unit 11.

The display unit 14 displays information. The display unit 14 includes, as a display device, for example, a liquid crystal display. The display unit 14 displays a menu screen that is used for operating the image forming apparatus 10 under control performed by the control unit 11.

The image reading unit 15 reads a document and converts it into image data. The image reading unit 15 includes an image reading device that optically reads a document and generates image data representing an image of the read document. The image reading unit 15 supplies the generated image data to the image processing unit 18.

The image forming unit 16 forms an image on a sheet. The image forming unit 16 includes an image forming mechanism for forming toner images of individual color components of YMCK on a sheet by using an electrophotographic system. The image forming mechanism may use another recording system, such as an inkjet system, instead of the electrophotographic system.

The communication unit 17 transmits and receives data. The communication unit 17 is connected to a communication network, and functions as a communication interface (hereinafter referred to as a "communication IF") that communicates with an external apparatus in a wired or wireless manner. In the exemplary embodiment of the present invention, the communication unit 17 functions as plural communication IFs. The specific configuration of the communication unit 17 will be described below.

The image processing unit 18 performs image processing on image data. Here, the image processing is, for example, color collection or gradation collection. In a case where a print function is implemented by the image forming apparatus 10, the image processing unit 18 supplies image data on which image processing has been performed to the image forming unit 16.

Figure 2:
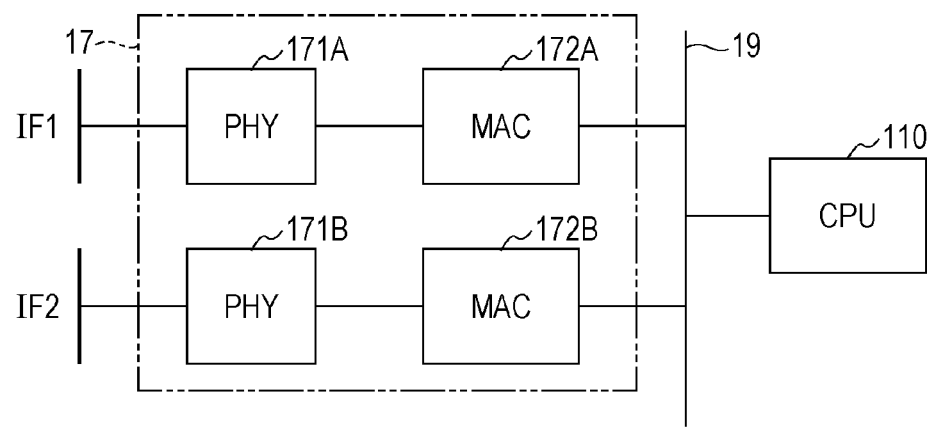
FIG. 2 is a block diagram illustrating the hardware configuration of a communication unit according to the exemplary embodiment.

FIG. 2 is a block diagram illustrating the hardware configuration of the communication unit 17. In the exemplary embodiment of the present invention, the communication unit 17 includes two physical layers (PHYs) 171 (171A and 171B) and two media access controllers (MACs) 172 (172A and 172B). The PHYs 171 specify a physical scheme about connection to a network and transmission of data in a physical layer of an open systems interconnection (OSI) reference model. The MACs 172 specify a transmission/reception method for a frame (a unit of transmission/reception of data), the form of a frame, and an error detection method in a data link layer of the OSI reference model, and perform predetermined processing on a packet (an example of a data unit) received in the PHYs 171. In the exemplary embodiment of the present invention, the PHY 171A and the MAC 172A function as a first communication IF (hereinafter referred to as a "communication IF 1"), and the PHY 171B and the MAC 172B function as a second communication IF (hereinafter referred to as a "communication IF 2"). The communication IF 1 and the communication IF 2 are connected to different communication networks. In a specific example, one of the communication IF 1 and the communication IF 2 is connected to the Internet, and the other is connected to a local area network (LAN), such as an intranet. In another example, the communication IF 1 and the communication IF 2 are connected to communication networks of different groups (divisions, sections, or the like). Each of the communication IF 1 and the communication IF 2 may be connected to a communication network in a wired or wireless manner.

The operations of the communication IF 1 and the communication IF 2 are controlled by the CPU 110. In the exemplary embodiment of the present invention, the CPU 110 switches the operation states of the individual communication IFs to reduce power consumption in the individual communication IFs. Specifically, for example, the CPU 110 switches the operation states of the communication IF 1 and the communication IF 2 from a normal state to a power saving state in a case where a predetermined condition is satisfied, for example, in a case where a packet (an example of a data unit) is not received by the communication IF 1 and the communication IF 2 for more than a predetermined period. The normal state is a state in which the power consumption is relatively high, whereas the power saving state is a state in which the power consumption is relatively low. In the normal state, the MACs 172 do not perform processing on a packet received in the PHYs 171 and leaves the processing to the CPU 110 in the subsequent stage, and the CPU 110 performs a response process or the like. In the power saving state, the MACs 172 are able to perform a response process or the like on a predetermined packet on behalf of the CPU 110. If a packet that induces recovery from the power saving state (hereinafter referred to as a "recovery packet") is received by a communication IF when the communication IF is in the power saving state, the CPU 110 switches the operation state of the communication IF from the power saving state to the normal state (cancel the power saving state of the communication IF). Hereinafter, a process performed by the CPU 110 and each communication IF to switch the operation state of the communication IF from the power saving state to the normal state is referred to as a "recover-from-power-saving-state process".

Figure 3:
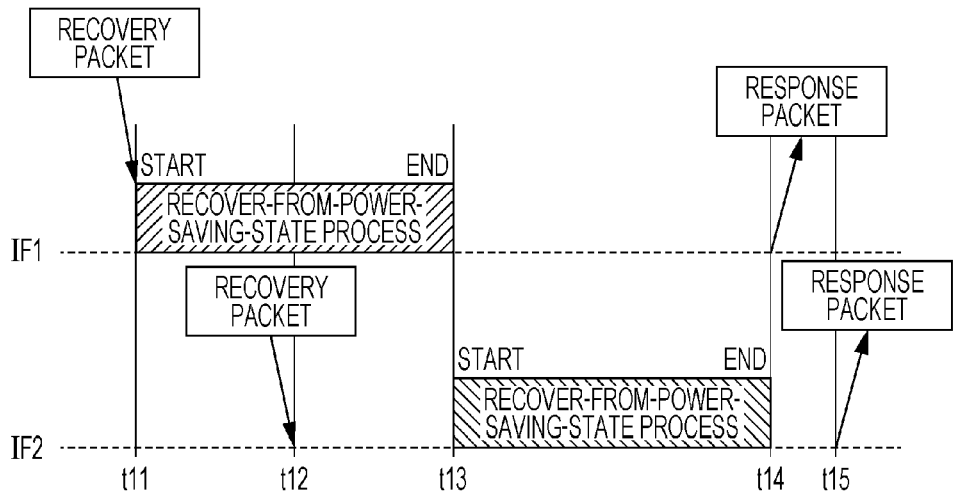
FIG. 3 is a diagram illustrating a recover-from-power-saving-state process performed by an image forming apparatus according to a comparative example.

FIG. 3 is a diagram illustrating a recover-from-power-saving-state process performed by the image forming apparatus 10 according to a comparative example. FIG. 3 illustrates a state in which recover-from-power-saving-state processes are performed for the communication IF 1 and the communication IF 2. In FIG. 3, the horizontal direction represents lapse of time, and shaded regions represent periods in which recover-from-power-saving-state processes are in progress for the communication IF 1 and the communication IF 2.

When a recovery packet is received by the communication IF 1 at time t11, the CPU 110 starts a recover-from-power-saving-state process for the communication IF 1. When a recovery packet is received by the communication IF 2 at time t12 while the recover-from-power-saving-state process for the communication IF 1 in progress, the CPU 110 continues the recover-from-power-saving-state process for the communication IF 1. When the recover-from-power-saving-state process for the communication IF 1 is finished at time t13, the CPU 110 starts a recover-from-power-saving-state process for the communication IF 2. When the recover-from-power-saving-state process for the communication IF 2 is finished at time t14, the CPU 110 responds to, via the communication IF 1, the recovery packet received at time t11. Responding to a recovery packet is performed by transmitting a predetermined packet (hereinafter referred to as a "response packet"). At time t15, the CPU 110 transmits, via the communication IF 2, a response packet for the recovery packet received at time t12.

In the example illustrated in FIG. 3, in a case where a recovery packet that induces recovery from the power saving state to the normal state is received by a second communication interface corresponding to one of plural networks while a recover-from-power-saving-state process is in progress for a first communication interface corresponding to another one of the plural networks, a recover-from-power-saving-state process for the second communication interface is started after the recover-from-power-saving-state process for the first communication interface has been finished. Further, response packets for recovery packets received by the individual communication interfaces are transmitted after the recover-from-power-saving-state processes for the individual communication interfaces have been finished. In this way, in an information processing apparatus including communication interfaces corresponding to plural networks, in a case where a recovery packet is received by a second communication interface while a recover-from-power-saving-state process for a first communication interface is in progress, a period from when a recovery packet is received to when a response packet is transmitted (hereinafter referred to as a "response period") becomes long in each of the communication interfaces, compared to an information processing apparatus including a single communication interface.

Figure 4:
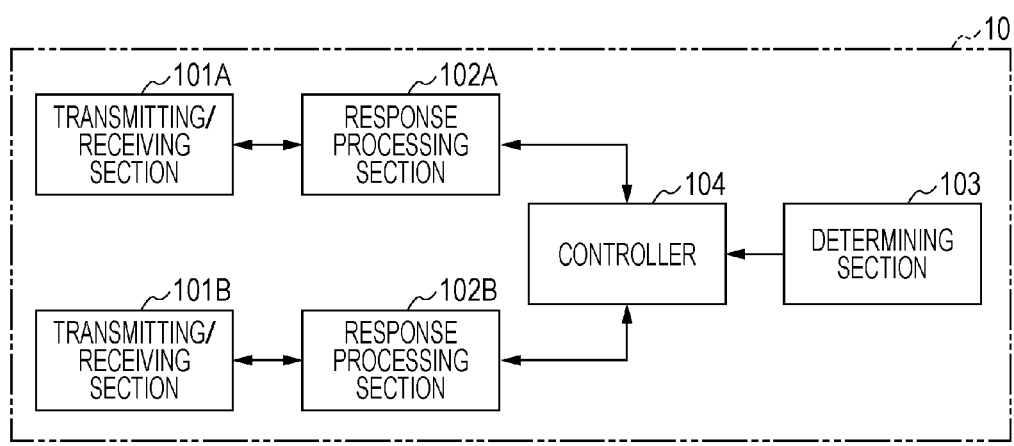
FIG. 4 is a block diagram illustrating the functional configuration of the image forming apparatus according to the exemplary embodiment.

FIG. 4 is a block diagram illustrating the functional configuration of the image forming apparatus 10. The image forming apparatus 10 includes plural transmitting/receiving sections 101 (101A and 101B), plural response processing sections 102 (102A and 102B), a determining section 103, and a controller 104. The transmitting/receiving sections 101 transmit data to and receive data from a network. The response processing sections 102 correspond to the transmitting/receiving sections 101 in a one-to-one relationship, and operate in either of a first state, in which each response processing section 102 does not perform a response process on data received from a corresponding one of the transmitting/receiving sections 101 and leaves processing of the data to the controller 104 in the subsequent stage, and a second state, in which each response processing section 102 does not leave processing of data received from a network to the controller 104 and performs a response process on at least part of the data. The determining section 103 determines priorities of state transition processes for the response processing sections 102. In the state transition processes, the response processing sections 102 are switched from the second state to the first state. The controller 104 controls, in a case where a second response processing section 102 among the plural response processing sections 102 starts a state transition process while a first response processing section 102 among the plural response processing sections 102 is performing a state transition process and in a case where the priorities determined by the determining section 103 indicate that the second response processing section 102 is given a higher priority than the first response processing section 102, the plural response processing sections 102 to suspend the state transition process for the first response processing section 102 and to start the state transition process for the second response processing section 102.

Referring to FIG. 2, the PHYs 171 correspond to an example of the transmitting/receiving sections 101. The MACs 172, which are controlled by the CPU 110 that executes a control program for controlling the operation states of the individual communication IFs, correspond to an example of the response processing sections 102. The CPU 110, which executes the control program, corresponds to an example of the determining section 103 and the controller 104.

Figure 5:
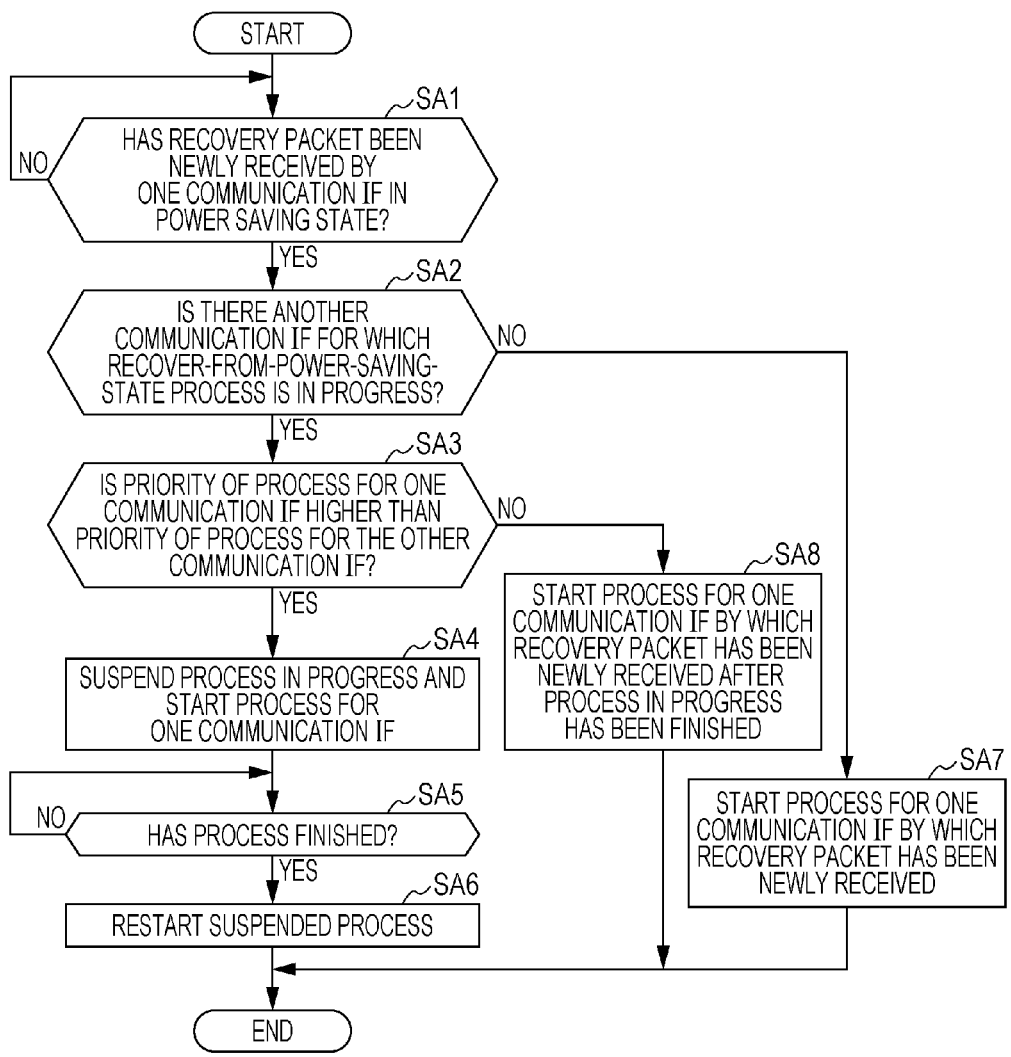
FIG. 5 is a flowchart illustrating a process of controlling operation states of communication IFs performed by the image forming apparatus according to the exemplary embodiment.

FIG. 5 is a flowchart illustrating a process of controlling the operation states of the communication IF 1 and the communication IF 2, performed by the image forming apparatus 10. The process illustrated in FIG. 5 is started when the operation state of at least one of the communication IF 1 and the communication IF 2 is the power saving state. The CPU 110 manages information representing the operation states of the individual communication IFs.

In step SA1, the CPU 110 determines whether or not a recovery packet has been newly received by one communication IF that is in the power saving state. Specifically, each MAC 172 has a filtering function for a packet received by a communication IF, and outputs a recovery packet to the CPU 110 upon receipt of the recovery packet. The CPU 110 obtains the recovery packet from the MAC 172, and thereby determines that the recovery packet has been received by the communication IF that is in the power saving state. If it is determined that a recovery packet has been newly received (YES in step SA1), the process proceeds to step SA2. If it is determined that a recovery packet has not been newly received (NO in step SA1), the CPU 110 waits until a recovery packet is newly received.

In step SA2, the CPU 110 determines whether or not there is another communication IF for which a recover-from-power-saving-state process is in progress. If it is determined that there is another communication IF for which a recover-from-power-saving-state process is in progress (YES in step SA2), the process proceeds to step SA3. If it is determined that there is no communication IF for which a recover-from-power-saving-state process is in progress (NO in step SA2), the process proceeds to step SA7.

In step SA3, the CPU 110 determines whether or not the priority of a recover-from-power-saving-state process for the one communication IF that has newly received a recovery packet is higher than the priority of a recover-from-power-saving-state process for the other communication IF that has already received a recovery packet. The priorities of recover-from-power-saving-state processes for the individual communication IFs are determined by the CPU 110 when the operation states of the individual communication IFs are switched from the normal state to the power saving state, and information representing the determined priorities is stored in the storage unit 12 in advance. A specific method for determining the priorities of recover-from-power-saving-state processes will be described below. In step SA3, the CPU 110 reads the information representing the priorities of recover-from-power-saving-state processes for the individual communication IFs from the storage unit 12 and compares them with one another. If it is determined that the priority of a recover-from-power-saving-state process for the one communication IF that has newly received a recovery packet is higher than the priority of a recover-from-power-saving-state process for the other communication IF that has already received a recovery packet (YES in step SA3), the process proceeds to step SA4. If it is determined that the priority of a recover-from-power-saving-state process for the one communication IF that has newly received a recovery packet is lower than the priority of a recover-from-power-saving-state process for the other communication IF that has already received a recovery packet (NO in step SA3), the process proceeds to step SA8.

In step SA4, the CPU 110 suspends the recover-from-power-saving-state process for the other communication IF, which is in progress, and starts a recover-from-power-saving-state process for the one communication IF that has newly received a recovery packet. In step SA5, the CPU 110 determines whether or not the recover-from-power-saving-state process that is newly started in step SA4 has been finished. If it is determined that the newly started recoverfrom-power-saving-state process has been finished (YES in step SA5), the CPU 110 transmits a response packet from the communication IF for which the recover-from-power-saving-state process has been finished, and the process proceeds to step SA6. If it is determined that the newly started recover-from-power-saving-state process has not been finished (NO in step SA5), the CPU 110 continues the recover-from-power-saving-state process.

In step SA6, the CPU 110 restarts the recover-from-power-saving-state process suspended in step SA4. After the restarted recover-from-power-saving-state process has been finished, the CPU 110 transmits a response packet from the communication IF for which the recover-from-power-saving-state process has been finished.

In step SA7, the CPU 110 starts a recover-from-power-saving-state process for the communication IF by which a recovery packet has been newly received. After the recover-from-power-saving-state process has been finished, the CPU 110 transmits a response packet from the communication IF for which the recover-from-power-saving-state process has been finished.

In step SA8, the CPU 110 continues the recover-from-power-saving-state process for the other communication IF that is in progress, and after the recover-from-power-saving-state process has been finished, the CPU 110 starts a recover-from-power-saving-state process for the one communication IF by which a recovery packet has been newly received. Every time a recover-from-power-saving-state process for a communication IF is finished, the CPU 110 transmits a response packet from the communication IF.

With the above-described process, in a case where a recovery packet is received by a communication IF while a recover-from-power-saving-state process is in progress for another communication IF, the recover-from-power-saving-state processes for the individual communication IFs are performed in accordance with the determined priorities. Accordingly, a response period for a communication IF that is given a high priority is shortened, and loss of a received packet in the communication IF is prevented.

FIG. 6 is a timing chart illustrating recover-from-power-saving-state processes performed by the image forming apparatus 10. FIG. 6 illustrates a state in which recover-from-power-saving-state processes are performed for the communication IF 1 and the communication IF 2 in accordance with the flowchart illustrated in FIG. 5. In the timing chart illustrated in FIG. 6, the priority of the recover-from-power-saving-state process for the communication IF 2 is higher than the priority of the recover-from-power-saving-state process for the communication IF 1.

When a recovery packet is received by the communication IF 1 at time t21, the CPU 110 starts a recover-from-power-saving-state process for the communication IF 1. When a recovery packet is received by the communication IF 2 at time t22 while the recover-from-power-saving-state process for the communication IF 1 is in progress, the CPU 110 suspends the recover-from-power-saving-state process for the communication IF 1, and starts a recover-from-power-saving-state process for the communication IF 2. When the recover-from-power-saving-state process for the communication IF 2 is finished at time t23, the CPU 110 transmits a response packet via the communication IF 2, and restarts the recover-from-power-saving-state process for the communication IF 1. When the recover-from-power-saving-state process for the communication IF 1 is finished at time t24, the CPU 110 transmits a response packet via the communication IF 1. As illustrated in FIG. 6, in a case where the recover-from-power-saving-state process for one communication IF is suspended and the recover-from-power-saving-state process for the other communication IF is started, the response packet from the other communication IF is transmitted before the response packet from the one communication IF is transmitted.

FIG. 7 is a diagram illustrating parameters that are used by the image forming apparatus 10 for determining the priorities of recover-from-power-saving-state processes for individual communication IFs. In this example, the image forming apparatus 10 calculates the values indicating the priority levels of the recover-from-power-saving-state processes performed for the individual communication IFs (hereinafter simply referred to as "priority levels") by using nine types of parameters illustrated in FIG. 7, compares the priority levels with one another, and determines the priorities of the recover-from-power-saving-state processes for the individual communication IFs. The parameters illustrated in FIG. 7 are obtained by the CPU 110 when the operation state of each communication IF is the normal state. That is, obtainment of the parameters illustrated in FIG. 7 is started when the operation state of each communication IF is switched from the power saving state to the normal state, and is stopped when the operation state is switched from the normal state to the power saving state. Among the nine types of parameters illustrated in FIG. 7, a parameter $x1$ is a parameter that directly indicates the frequency at which each communication IF is used, and parameters $x2$ to $x9$ are parameters that indirectly indicate the frequency at which each communication IF is used. In this example, the parameter $x1$ is the most influential parameter to calculate a priority level, and the parameters $x2$ to $x9$ are parameters that are supplementarily used to increase the accuracy of a priority level. Larger values of the parameters $x1$ to $x9$ indicate a higher frequency at which the communication IF is used. Hereinafter, the nine types of parameters will be described, and then a specific method for calculating a priority level will be described.

The parameter $x1$ indicates the sum of the number of times an SYN packet has been received and the number of times an SYN/ACK packet has been received by each communication IF. A larger value of the parameter $x1$ indicates a higher frequency at which the communication IF is used. Alternatively, the parameter $x1$ may indicate one of the number of times an SYN packet has been received and the number of times an SYN/ACK packet has been received.

The parameter $x2$ indicates the number of Internet protocol (IP) addresses or MAC addresses registered in an address resolution protocol (ARP) table, which is managed for each communication IF. A larger value of the parameter $x2$ indicates a larger number of terminal apparatuses connected via the communication IF and a larger number of terminal apparatuses capable of using various services (for example, a print service, a facsimile service, and so forth) provided by the image forming apparatus 10.

The parameter $x3$ indicates the number of ports whose state in transmission control protocol (TCP)/IP communication is "LISTEN". The parameter $x4$ indicates the number of ports available in user datagram protocol (UDP) communication. A larger value of the parameter $x3$ and the parameter $x4$ indicates a larger number of services allocated to each communication IF.

The parameter $x5$ indicates larger/smaller of the number of packets that have been transmitted/received by each communication IF. The number of packets that have been transmitted/received by each communication IF includes not only the number of packets that have been transmitted/received to use the various services provided by the image forming apparatus 10, but also the number of packets that have been transmitted/received to maintain or manage the network connection between the image forming apparatus 10 and an external apparatus. The parameter x5 is a value "0" or "1". In a case where one communication IF has "0" as the parameter x5, it means that the number of packets that have been transmitted/received by the one communication IF is smaller than the number of packets that have been transmitted/received by the other communication IF. In a case where one communication IF has "1" as the parameter x5, it means that the number of packets that have been transmitted/received by the one communication IF is larger than the number of packets that have been transmitted/received by the other communication IF.

The parameter x6 indicates larger/smaller of the number of packets that have been transmitted/received in the size of a maximum transfer unit (MTU). In a case where the number of packets that have been transmitted in the size of MTU is large, it means that there is a tendency that the number of packets that have been transmitted/received to use the various services provided by the image forming apparatus 10 is large. The parameter x6 is a value "0" or "1". In a case where one communication IF has "0" as the parameter x6, it means that the number of packets that have been transmitted/received in the size of MTU by the one communication IF is smaller than the number of packets that have been transmitted/received in the size of MTU by the other communication IF. In a case where one communication IF has "1" as the parameter x6, it means that the number of packets that have been transmitted/received in the size of MTU by the one communication IF is larger than the number of packets that have been transmitted/received in the size of MTU by the other communication IF.

The parameter x7 indicates larger/smaller of the number of packets that have been received from a terminal apparatus in a sub-network in which the image forming apparatus 10 is included. The parameter x7 is a value "0" or "1". In a case where one communication IF has "0" as the parameter x7, it means that the number of packets in the one communication IF is smaller than the number of packets in the other communication IF. In a case where one communication IF has "1" as the parameter x7, it means that the number of packets in the one communication IF is larger than the number of packets in the other communication IF.

The parameter x8 indicates larger/smaller of the number of packets that have been received via a gateway. The parameter x8 is a value "0" or "1". In a case where one communication IF has "0" as the parameter x8, it means that the number of packets in the one communication IF is smaller than the number of packets in the other communication IF. In a case where one communication IF has "1" as the parameter x8, it means that the number of packets in the one communication IF is larger than the number of packets in the other communication IF.

The parameter x9 indicates higher/lower of communication speed in each communication IF. The parameter x9 is a value "0" or "1". In a case where one communication IF has "0" as the parameter x9, it means that the communication speed in the one communication IF is lower than the communication speed in the other communication IF. In a case where one communication IF has "1" as the parameter x9, it means that the communication speed in the one communication IF is higher than the communication speed in the other communication IF.

Among the parameters illustrated in FIG. 7, the parameters x1 to x4 are obtained by the CPU 110 when the operation state of each communication IF is the normal state. That is, obtainment of the parameters x1 to x4 is started when the operation state of each communication IF is switched from the power saving state to the normal state, and is stopped when the operation state of each communication IF is switched from the normal state to the power saving state. Regarding the parameters x5 to x8, the numbers of packets related to the individual parameters (the number of packets that have been transmitted/received by each communication IF, the number of packets that have been transmitted/received in the size of MTU, the number of packets that have been received from a terminal apparatus in a sub-network in which the image forming apparatus 10 is included, and the number of packets that have been received via a gateway) are obtained by the CPU 110 when the operation state of each communication IF is the normal state, and a value "0" or "1" is stored in the storage unit 12 when the operation state of each communication IF is switched from the normal state to the power saving state. Regarding the parameter x9, the communication speed in each communication IF is measured by the CPU 110, and a value "0" or "1" is stored in advance in the storage unit 12.

Next, a method for calculating a priority level will be described. The CPU 110 calculates a priority level P for each communication IF by using the following Equation (1).

$$P = \sum_{i=1}^{9} (xiwi) \quad (1)$$

Here, wi represents a weight that is set in advance in accordance with the degree of importance of each parameter xi, and is stored in the storage unit 12. As described above, the parameter x1 is a parameter that directly indicates the frequency at which each communication IF is used, and the parameters x2 to x9 are parameters that indirectly indicate the frequency at which each communication IF is used. Thus, a weight w1 of the parameter x1 is set so as to be larger than weights w2 to w9 of the parameters x2 to x9. There is a tendency that the recover-from-power-saving-state process for the communication IF that is highly frequently used in communication in a sub-network in which the image forming apparatus 10 is included is desired to be performed earlier than the recover-from-power-saving-state process for a communication IF that is highly frequently used for communication via a gateway. Thus, the weight w7 of the parameter x7 is set to be larger than the weight w8 of the parameter x8. The weights of the parameters x1 to x9 are as follows, for example, w1=10, w2=9, w3=8, w4=8, w5=5, w6=5, w7=4, w8=2, and w9=2.

Figure 8:
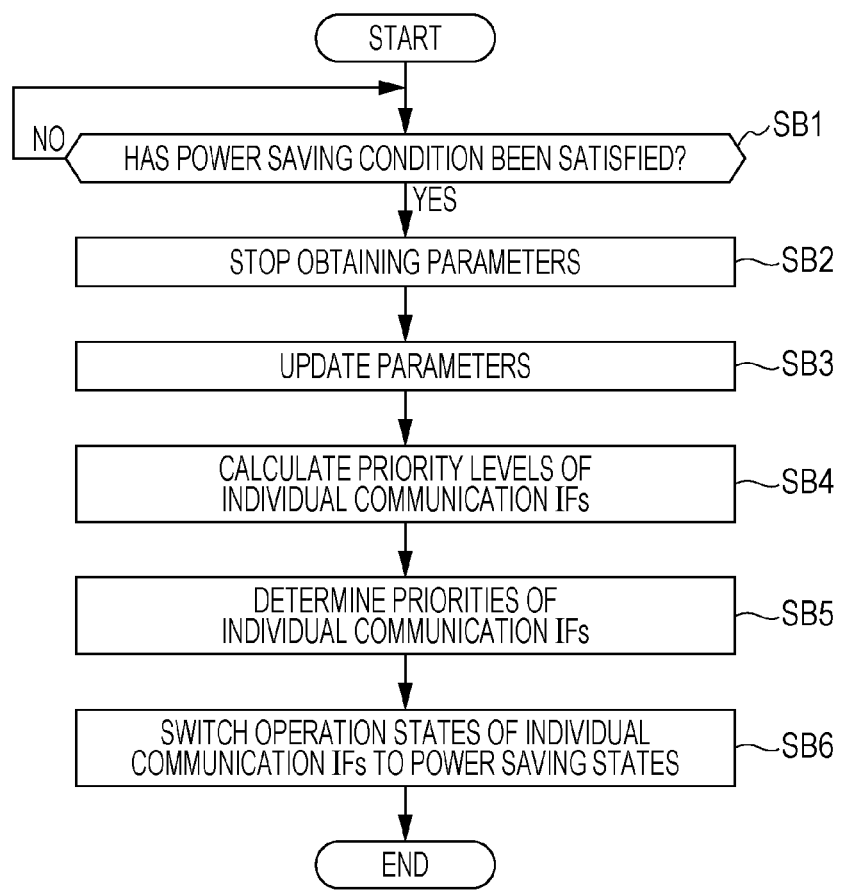
FIG. 8 is a flowchart illustrating a process of determining priorities of recover-from-power-saving-state processes according to the exemplary embodiment.

FIG. 8 is a flowchart illustrating a process of determining the priorities of the recover-from-power-saving-state processes for the individual communication IFs, performed by the image forming apparatus 10. The process illustrated in FIG. 8 is started when the individual communication IFs are in the normal state. As described above, the CPU 110 obtains the parameters x1 to x8 (as for the parameters x5 to x8, the number of packets related to each parameter) when the individual communication IFs are in the normal state and stores them in the RAM. Also, the CPU 110 stores the parameter x9 in the storage unit 12 in advance.

In step SB1, the CPU 110 determines whether or not a condition for switching the operation states of the individual communication IFs from the normal state to the power saving state (hereinafter referred to as a "power saving condition") is satisfied. The CPU 110 determines, for example, whether a predetermined packet is not received by the communication IF 1 and the communication IF 2 over a predetermined period. If it is determined that the power saving condition is satisfied (YES in step SB1), the process proceeds to step SB2. If it is determined that the power saving condition is not satisfied (NO in step SB1), the CPU 110 waits until the power saving condition is satisfied.

In step SB2, the CPU 110 stops obtaining the parameters x1 to x8. In step SB3, the CPU 110 updates plural parameters stored in the storage unit 12 by using the parameters that have been newly stored in the RAM. In this example, the CPU 110 overwrites the plural parameters stored in the storage unit 12 with the parameters that have been newly stored in the RAM. Regarding the parameters x5 to x8, the number of packets related to each parameter stored in the RAM is compared between the communication IF 1 and the communication IF 2, and the storage unit 12 is overwritten with a value "0" or "1". Accordingly, the parameters obtained from when the operation states of the communication IF 1 and the communication IF 2 are switched to the normal state to when the priorities of the recover-from-power-saving-state processes for the individual communication IFs are determined are stored in the storage unit 12.

In step SB4, the CPU 110 calculates the priority levels P of the communication IF 1 and the communication IF 2. The CPU 110 reads, from the storage unit 12, the parameters for the individual communication IFs, and calculates the priority levels P by using Equation (1) given above. The CPU 110 stores, in the RAM, the calculated priority level P for the communication IF 1 (hereinafter referred to as a "priority level P1") and the calculated priority level P for the communication IF 2 (hereinafter referred to as a "priority level P2").

In step SB5, the CPU 110 determines the priorities of the communication IF 1 and the communication IF 2. Specifically, the CPU 110 reads the priority level P1 and the priority level P2 from the RAM, compares both of the values, and thereby determines the priorities of the communication IF 1 and the communication IF 2. For example, in a case where the priority level P1 is equal to or higher than the priority level P2, the CPU 110 determines that the communication IF 1 is given the highest priority and that the communication IF 2 is given the second highest priority. In a case where the priority level P2 is higher than the priority level P1, the CPU 110 determines that the communication IF 2 is given the highest priority and that the communication IF 1 is given the second highest priority. The CPU 110 stores information representing the determined priorities in the storage unit 12. In step SB6, the CPU 110 switches the operation states of the communication IF 1 and the communication IF 2 to the power saving state.

With the above-described process, the priorities of the recover-from-power-saving-state processes for the individual communication IFs are determined when the power saving condition is satisfied. In the process illustrated in FIG. 8, the priority levels P are calculated by using the parameters that are obtained in the closest period in which the individual communication IFs are in the normal state (not in the power saving state), and the priorities of the individual communication IFs are determined. Thus, the priorities of the individual communication IFs are determined in accordance with the states of the individual communication IFs in the closest period in which the individual communication IFs are in the normal state.

The exemplary embodiment of the present invention is not limited to the above-described exemplary embodiment, and various modification examples may be implemented.

Hereinafter, some modification examples will be described. Two or more of the modification examples described below may be implemented in combination.

First Modification Example

The priorities of the individual communication IFs are not necessarily determined by using only parameters obtained in the closest period in which the individual communication IFs are in the normal state. The priorities of the individual communication IFs may be determined by using parameters obtained in a period from when power supply to the image forming apparatus 10 is started to when the priorities are determined. In this case, parameters obtained in the period from when power supply to the image forming apparatus 10 is started to when the priorities are determined are stored in the storage unit 12 in an integrated manner. Specifically, in step SB3, the CPU 110 adds parameters stored in the RAM (newly obtained parameters) to the plural parameters stored in the storage unit 12. In step SB4, the CPU 110 reads the integrated values of the parameters for the individual communication IFs from the storage unit 12, and calculates the priority levels P by using Equation (1) given above. In the first modification example, integrated values of the individual parameters are substituted to x1 to x9 of Equation (1). According to the first modification example, the priorities of the individual communication IFs are determined in accordance with the frequencies at which the individual IFs are used in a period from when power supply to the image forming apparatus 10 is started to when the priorities of the individual IFs are determined.

Second Modification Example

In step SA4, the CPU 110 may continue the recover-from-power-saving-state process for the other communication IF that has already been started. In this case, after the recover-from-power-saving-state process for the other communication IF has been finished, the CPU 110 starts the recover-from-power-saving-state process for the one communication IF that has newly received a recovery packet, without transmitting a response packet from the communication IF. After the recover-from-power-saving-state process for the one communication IF has been finished, the CPU 110 transmits a response packet from the one communication IF, and then transmits a response packet from the other communication IF.

Figure 9:
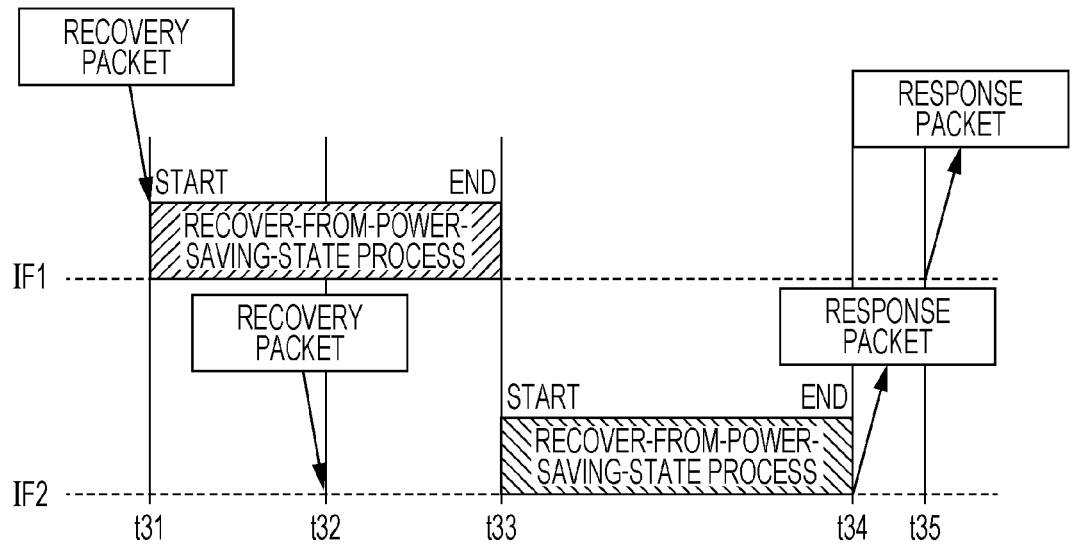
FIG. 9 is a timing chart illustrating a recover-from-power-saving-state process according to a second modification example.

FIG. 9 is a timing chart illustrating recover-from-power-saving-state processes according to the second exemplary embodiment. FIG. 9 illustrates a timing chart in a case where the priority of the recover-from-power-saving-state process for the communication IF 2 is higher than the priority of the recover-from-power-saving-state process for the communication IF 1. When a recovery packet is received by the communication IF 1 at time t31, the CPU 110 starts a recover-from-power-saving-state process for the communication IF 1. When a recovery packet is received by the communication IF 2 at time t32 while the recover-from-power-saving-state process for the communication IF 1 is in progress, the CPU 110 continues the recover-from-power-saving-state process for the communication IF. When the recover-from-power-saving-state process for the communication IF 1 is finished at time t33, the CPU 110 starts a recover-from-power-saving-state process for the communication IF 2. When the recover-from-power-saving-state process for the communication IF 2 is finished at time t34, the CPU 110 transmits a response packet from the communication IF 2. At time t35, the CPU 110 transmits a response packet from the communication IF 1. In the example illustrated in FIG. 9, in a case where plural packets for which response is necessary have been received by the communication IF 2, the communication IF 1 waits until a response packet to the plural packets has been transmitted from the communication IF 2, and after that transmits a response packet.

Third Modification Example

The timing at which the priorities of recover-from-power-saving-state processes for the individual communication IFs are determined and the timing at which the priority levels of the individual communication IFs are calculated are not limited to the timings described in the above exemplary embodiment. For example, the CPU 110 may calculate the priority levels of the individual communication IFs and determine the priorities of the recover-from-power-saving-state processes for the individual communication IFs after it is determined in step SA2 that there is a communication IF for which a recover-from-power-saving-state process is in progress and before the determination in step SA3 is performed.

Fourth Modification Example

The parameters used to calculate the priority levels of the individual communication IFs are not limited to the parameters described in the above exemplary embodiment. Any parameters that directly or indirectly indicate the frequencies at which the individual communication IFs are used may be used to calculate the priority levels. Also, the priority levels of the individual communication IFs may be calculated by using some of the parameters described in the above exemplary embodiment. For example, the priority levels of the individual communication IFs may be calculated by using only the parameters x1 to x4, without using the parameters x5 to x9. Further, the priority levels of the individual communication IFs may be calculated by using an equation other Equation (1). Each of the parameters x5 to x9 is not necessarily a value "0" or "1". For example, the value of the upper n digits (for example, upper one digit or two digits) of the number of packets related to the individual parameters may be used as the values of the parameters x5 to x8. Also, the value indicating the communication speed in the individual communication IFs may be used as the parameter x9.

Fifth Modification Example

The priorities of the recover-from-power-saving-state processes for the individual communication IFs are not necessarily determined by comparing the priority levels of the individual communication IFs. For example, the priorities of the recover-from-power-saving-state processes for the individual communication IFs may be determined by a user by operating the operation unit 13. In this case, the CPU 110 may display the parameters described in the above exemplary embodiment on the display unit 14 so that the user is able to grasp the frequencies at which the individual communication IFs are used. The user may designate the priorities for the communication IFs for each time.

Sixth Modification Example

Control of the operation state of a communication IF according to an exemplary embodiment of the present invention may be performed by an information processing apparatus other than the image forming apparatus 10. For example, control of the operation state of a communication IF according to an exemplary embodiment of the present invention may be performed by an image processing apparatus or the like that performs image processing on image data.

Seventh Modification Example

The power saving condition is not limited to the condition described in the above exemplary embodiment. For example, whether or not the frequencies at which a predetermined packet is received by the communication IF 1 and the communication IF 2 is lower than a predetermined frequency may be determined to determine whether or not the power saving condition is satisfied.

Other Modification Examples

The configuration of the image forming apparatus 10 is not limited to the configuration illustrated in FIGS. 1 and 2. The image forming apparatus 10 may have any configuration as long as the image forming apparatus 10 is able to perform the processes illustrated in FIGS. 5 and 8. For example, the communication unit 17 may function as three or more communication IFs.

In this exemplary embodiment, a control program executed by the image forming apparatus 10 may be provided in the state of being stored in a computer-readable storage medium, such as a magnetic storage medium (for example, magnetic tape or magnetic disk (hard disk drive (HDD), flexible disk (FD), or the like)), an optical storage medium (for example, an optical disc (compact disc (CD), digital versatile disc (DVD), or the like)), a magneto-optical storage medium, or a semiconductor memory (for example, a flash ROM). Alternatively, the control program may be downloaded via a network such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a plurality of transmitting/receiving sections that transmit data to and receive data from a plurality of networks;
a plurality of response processing sections that correspond to the plurality of transmitting/receiving sections in a one-to-one relationship, a state of each of the plurality of response processing sections being switchable between a first state and a second state, the first state being a state in which the response processing section does not perform a response process on data received from a corresponding one of the plurality of transmitting/receiving sections and leaves processing of the data to a controller in a subsequent stage, the second state being a state in which the response processing section does not leave processing of data received from a network to the controller and performs a response process on at least part of the data;

a determining section that determines priorities of state transition processes for the plurality of response processing sections, the state transition processes being processes in which the plurality of response processing sections are switched from the second state to the first state; and the controller that, in a case where a second response processing section among the plurality of response processing sections starts a state transition process while a first response processing section among the plurality of response processing sections is performing a state transition process and in a case where the priorities determined by the determining section indicate that the second response processing section is given a higher priority than the first response processing section, controls the plurality of response processing sections to suspend the state transition process for the first response processing section and to start the state transition process for the second response processing section.

2. The information processing apparatus according to claim 1, wherein in a case where the state transition process for the first response processing section has been suspended and the state transition process for the second response processing section has been started, the controller controls the first response processing section to restart the state transition process for the first response processing section after the state transition process for the second response processing section has been finished.

3. The information processing apparatus according to claim 1, wherein in a case where the first response processing section has received data that induces start of a state transition process, the controller performs control to start the state transition process for the first response processing section, and performs a response process on the data after the state transition process for the first response processing section has been finished, and in a case where the state transition process for the first response processing section has been suspended and the state transition process for the second response processing section has been started, the controller responds, after finishing the state transition process for the second response processing section and before responding to the data that induces start of the state transition process for the first response processing section, to data received by the second response processing section.

4. The information processing apparatus according to claim 2, wherein in a case where the first response processing section has received data that induces start of a state transition process, the controller performs control to start the state transition process for the first response processing section, and performs a response process on the data after the state transition process for the first response processing section has been finished, and in a case where the state transition process for the first response processing section has been suspended and the state transition process for the second response processing section has been started, the controller responds, after finishing the state transition process for the second response processing section and before responding to the data that induces start of the state transition process for the first response processing section, to data received by the second response processing section.

5. The information processing apparatus according to claim 1, wherein the determining section determines the priorities by using parameters indicating response frequencies of the plurality of transmitting/receiving sections.

6. The information processing apparatus according to claim 2, wherein the determining section determines the priorities by using parameters indicating response frequencies of the plurality of transmitting/receiving sections.

7. The information processing apparatus according to claim 3, wherein the determining section determines the priorities by using parameters indicating response frequencies of the plurality of transmitting/receiving sections.

8. The information processing apparatus according to claim 4, wherein the determining section determines the priorities by using parameters indicating response frequencies of the plurality of transmitting/receiving sections.

9. The information processing apparatus according to claim 5, wherein the determining section determines the priorities by using the parameters that are related to a closest period in which the plurality of response processing sections are in the second state.

10. The information processing apparatus according to claim 6, wherein the determining section determines the priorities by using the parameters that are related to a closest period in which the plurality of response processing sections are in the second state.

11. The information processing apparatus according to claim 7, wherein the determining section determines the priorities by using the parameters that are related to a closest period in which the plurality of response processing sections are in the second state.

12. The information processing apparatus according to claim 8, wherein the determining section determines the priorities by using the parameters that are related to a closest period in which the plurality of response processing sections are in the second state.

13. The information processing apparatus according to claim 5, wherein the determining section determines the priorities by using the parameters that are related to a period from when power supply to the information processing apparatus is started to when the determining section determines the priorities.

14. The information processing apparatus according to claim 6, wherein the determining section determines the priorities by using the parameters that are related to a period from when power supply to the information processing apparatus is started to when the determining section determines the priorities.

15. The information processing apparatus according to claim 7, wherein the determining section determines the priorities by using the parameters that are related to a period from when power supply to the information processing apparatus is started to when the determining section determines the priorities.

16. The information processing apparatus according to claim 8, wherein the determining section determines the priorities by using the parameters that are related to a period from when power supply to the information processing apparatus is started to when the determining section determines the priorities.

17. An information processing method for an information processing apparatus including a plurality of transmitting/receiving sections that transmit data to and receive data from a plurality of networks, and a plurality of response processing sections that correspond to the plurality of transmitting/receiving sections in a one-to-one relationship, a state of each of the plurality of response processing sections being switchable between a first state and a second state, the first state being a state in which the response processing section does not perform a response process on data received from a corresponding one of the plurality of transmitting/receiving sections and leaves processing of the data to a controller in a subsequent stage, the second state being a state in which the response processing section does not leave processing of data received from a network to the controller and performs a response process on at least part of the data, the information processing method comprising:

determining priorities of state transition processes for the plurality of response processing sections, the state transition processes being processes in which the plurality of response processing sections are switched from the second state to the first state; and in a case where a second response processing section among the plurality of response processing sections starts a state transition process while a first response processing section among the plurality of response processing sections is performing a state transition process and in a case where the priorities determined in the determining indicate that the second response processing section is given a higher priority than the first response processing section, controlling the plurality of response processing sections to suspend the state transition process for the first response processing section and to start the state transition process for the second response processing section.

18. A non-transitory computer readable medium storing a program causing a computer to execute a process, the computer including a plurality of transmitting/receiving sections that transmit data to and receive data from a plurality of networks, and a plurality of response processing sections that correspond to the plurality of transmitting/receiving sections in a one-to-one relationship, a state of each of the plurality of response processing sections being switchable between a first state and a second state, the first state being a state in which the response processing section does not perform a response process on data received from a corresponding one of the plurality of transmitting/receiving sections and leaves processing of the data to a controller in a subsequent stage, the second state being a state in which the response processing section does not leave processing of data received from a network to the controller and performs a response process on at least part of the data, the process comprising:

determining priorities of state transition processes for the plurality of response processing sections, the state transition processes being processes in which the plurality of response processing sections are switched from the second state to the first state; and in a case where a second response processing section among the plurality of response processing sections starts a state transition process while a first response processing section among the plurality of response processing sections is performing a state transition process and in a case where the priorities determined in the determining indicate that the second response processing section is given a higher priority than the first response processing section, controlling the plurality of response processing sections to suspend the state transition process for the first response processing section and to start the state transition process for the second response processing section.

\* \* \* \* \*